United States Patent
Laimboeck et al.

(10) Patent No.: US 9,593,710 B2
(45) Date of Patent: Mar. 14, 2017

(54) MASTER AND SLAVE PULLRODS

(71) Applicant: EcoMotors, Inc., Allen Park, MI (US)

(72) Inventors: Franz J. Laimboeck, Goleta, CA (US); Roger Budde, Chemnitz (DE); Tyler Garrard, Buellton, CA (US)

(73) Assignee: EcoMotors, Inc., Allen Park, MI (US)

( * ) Notice: Subject to any disclaimer, the term of this patent is extended or adjusted under 35 U.S.C. 154(b) by 15 days.

(21) Appl. No.: 14/521,642

(22) Filed: Oct. 23, 2014

(65) Prior Publication Data

US 2015/0114358 A1   Apr. 30, 2015

Related U.S. Application Data

(60) Provisional application No. 61/894,943, filed on Oct. 24, 2013.

(51) Int. Cl.
*F16C 7/02* (2006.01)
*F02B 75/24* (2006.01)
*F02B 75/28* (2006.01)
*F01B 1/08* (2006.01)

(52) U.S. Cl.
CPC ............... *F16C 7/023* (2013.01); *F01B 1/08* (2013.01); *F02B 75/24* (2013.01); *F02B 75/282* (2013.01); *Y10T 29/49286* (2015.01)

(58) Field of Classification Search
CPC .. F02B 75/28; F02B 75/282; F02B 2075/025; F02B 25/08; F02B 53/02; F02B 75/20; F01B 7/02; F01B 1/062; F01B 1/08
USPC .......... 123/51.1–52.6, 53.3, 53.6, 55.2, 55.5, 123/55.7
See application file for complete search history.

(56) References Cited

U.S. PATENT DOCUMENTS

| | | | |
|---|---|---|---|
| 1,889,583 A | 7/1928 | Woolson | |
| 7,578,267 B2 * | 8/2009 | Hofbauer | F02B 1/12 123/50 B |
| 2010/0229836 A1 * | 9/2010 | Hofbauer | F01B 7/14 123/51 R |
| 2012/0204841 A1 * | 8/2012 | Hofbauer | F16C 7/023 123/51 BA |
| 2012/0247419 A1 * | 10/2012 | Hofbauer | F02B 75/243 123/197.3 |
| 2013/0098328 A1 * | 4/2013 | Hofbauer | F02B 75/28 123/192.2 |

* cited by examiner

*Primary Examiner* — Long T Tran
(74) *Attorney, Agent, or Firm* — Barnes & Thornburg LLP

(57) ABSTRACT

Master and slave pullrods are disclosed in which a master pullrod is coupled to a journal of a crankshaft. The slave pullrod indirectly couples to the crankshaft by coupling to the master pullrod. Such a configuration allows two connecting rods to be coupled to the journal of the crankshaft inline with each other.

12 Claims, 5 Drawing Sheets

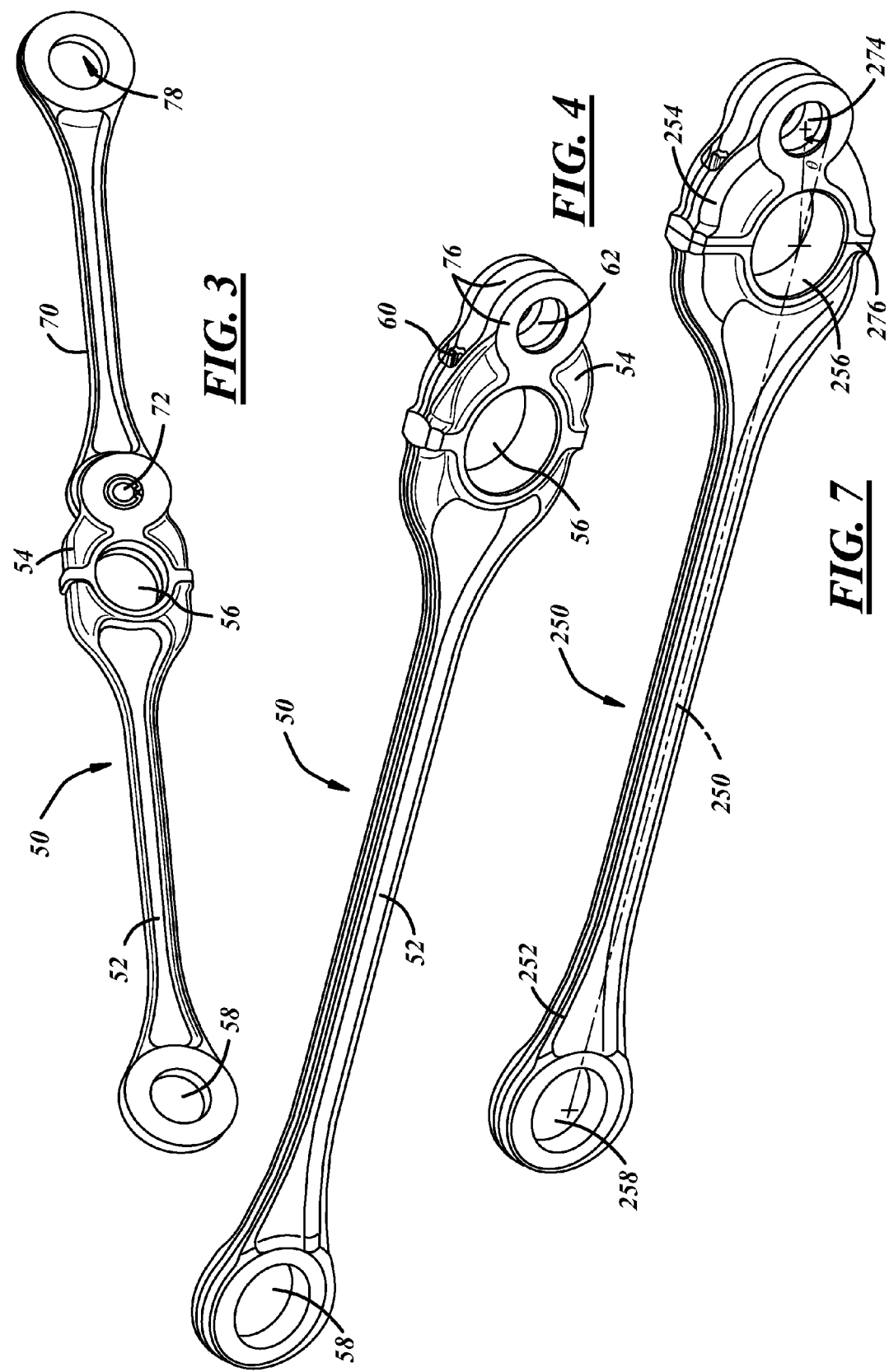

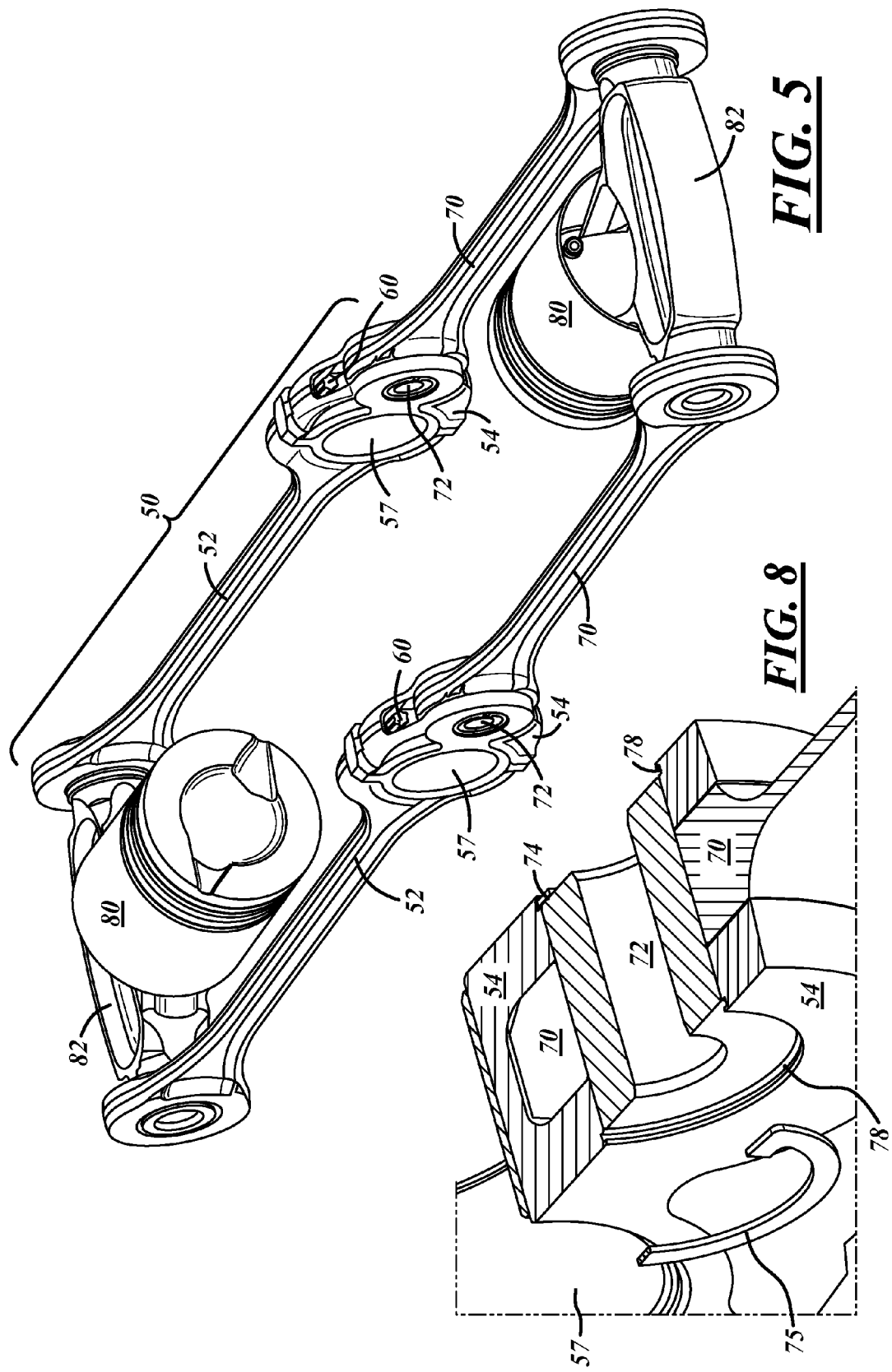

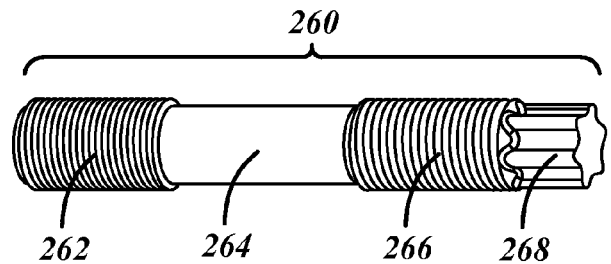
FIG.9
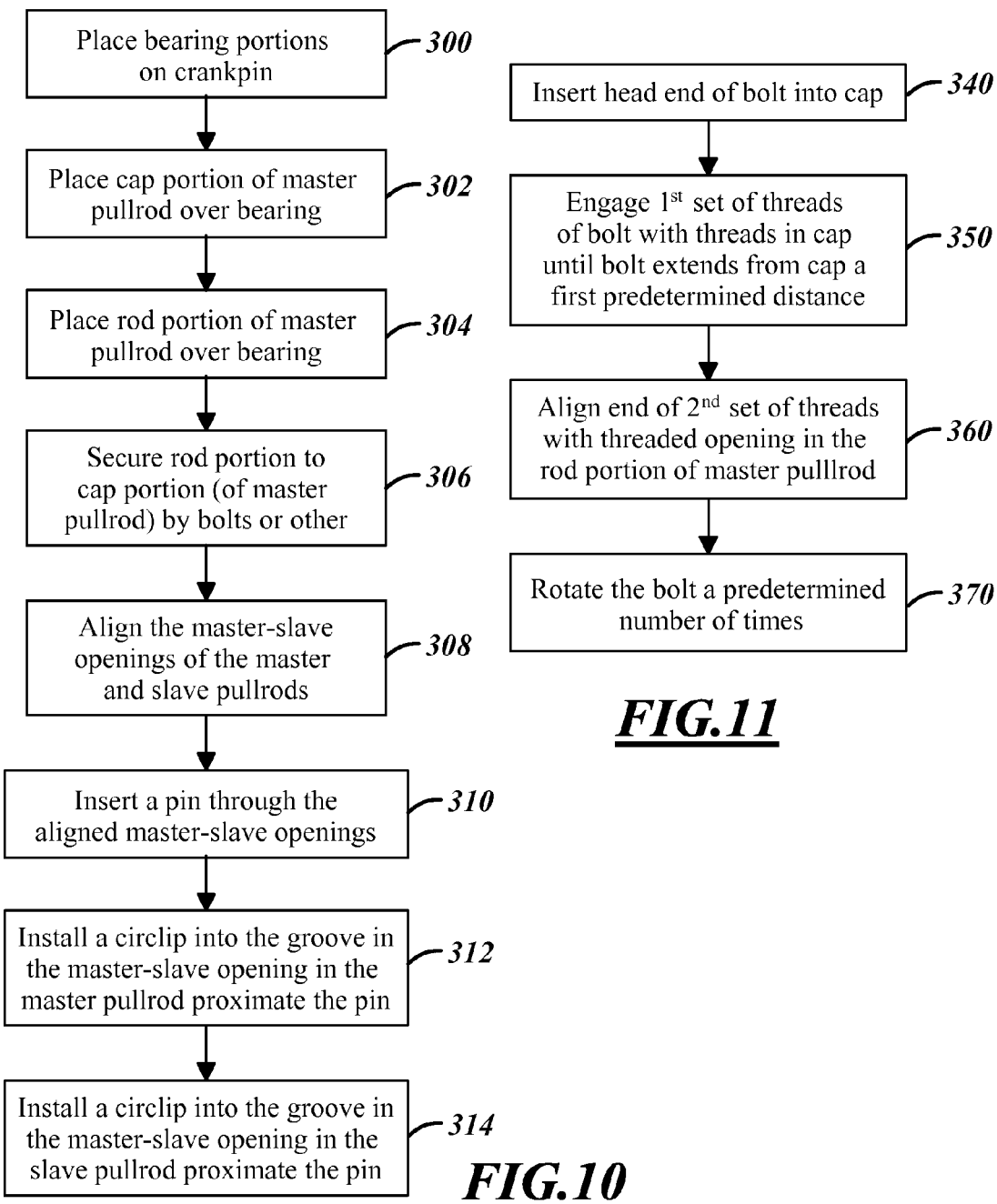
FIG.10
FIG.11

MASTER AND SLAVE PULLRODS

FIELD

The present disclosure relates to internal combustion engines in general and connecting rods used to connect pistons to crankshafts.

BACKGROUND

It is well-known to use master-slave pushrods in multi-cylinder engines in which a master pushrod connects a first piston to a journal or crankpin of the crankshaft and a slave pushrod connects between a second piston and the slave pushrod.

SUMMARY

A lightweight piston system is disclosed that has a crown and a substantially-cylindrical skirt affixed to the crown at a first end of the cylindrical skirt, and a bridge structure coupled to a second end of the skirt. The bridge structure includes: a central support structure, a first projection extending outwardly from the central support structure in a first radial direction, and a second projection extending outwardly from the central support structure in a second radial direction. The first and second directions are substantially diametrically opposed.

BRIEF DESCRIPTION OF THE DRAWINGS

FIG. 3 is an illustration of master and slave pullrods according to an embodiment of the present disclosure;

FIG. 4 is an illustration of the master and slave pullrods of FIG. 3 in which the master pullrod is shown partially in cross section;

FIG. 5 is an illustration of an assembly of the master and slave pullrods, the pistons, and the piston bridges;

FIG. 7 is a master pullrod according to an embodiment of the present disclosure in which the master-slave opening is offset;

FIG. 8 illustrates one embodiment to fasten the cap of the master pullord to the rod portion of the master pullrod with a bolt having two thread pitches;

FIG. 9 is an illustration of one embodiment by which the pin may be secured in the master-slave openings; and FIGS. 10 and 11 are flowcharts showing assembly processes.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 2:
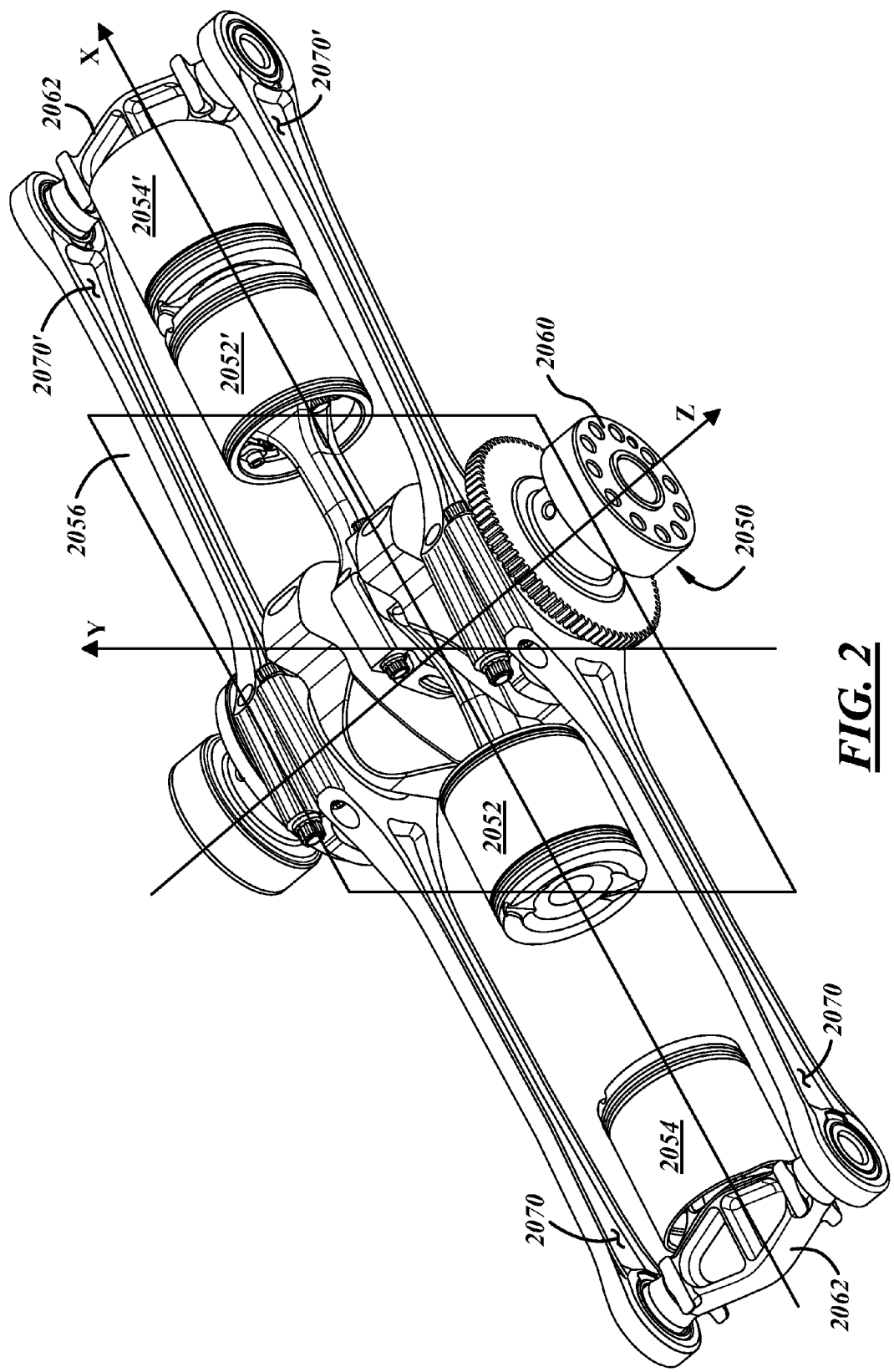
FIG. 2 is a representation of an opposed-piston, opposed-cylinder engine in which the opposed cylinders are collinear.

As described above, it is known to use a master-slave pushrod configuration for coupling multiple pistons to a single crankpin of a crankshaft. In such engines, the pushrods are either under compression almost exclusively, or in the case of a four-stroke engine, under tension and compression. However, compression forces serve as a critical design constraint for the pushrod. There are engine configurations, however, in which the connecting rod is almost exclusively in tension during operation. One such engine is an opposed-piston, opposed cylinder (OPOC) engine 10, such as that shown isometrically in FIG. 2.

First inner piston 2052 and first outer piston 2054 reciprocate along the x axis within a first cylinder wall (not shown for purposes of illustration). Second inner piston 2052' and second outer piston 2054' reciprocate along the x axis with a second cylinder wall (also not shown). The central axes of the first and second cylinders (which coincide with the central axes of the pistons disposed therein) are collinear. The central axes are substantially parallel to the axis of rotation of the crankshaft, which is indicated by z in FIG. 2. Outer pistons 2054 and 2054' are coupled to crankshaft 2060 via pullrods 2070 and 2070', respectively. In this two-stroke engine, outer pistons 2054 and 2054' are pulled toward crankshaft 2060 for a compression stroke and the pistons are pushed outwardly from crankshaft 2060 during an expansion stroke (as driven by combustion gases). Pullrods 2070 and 2070' are consequently in tension during both of these strokes. Pullrods 2070 and 2070', as shown, are rather thin and about twice as long as pushrods coupled between inner pistons 2052 and 2052' and crankshaft 2060. The thin, long pullrods are possible due to being in tension. Pullrods 2070 and 2070' couple to pistons 2054 and 2054' via bridges 2062 and 2062', respectively.

A master-slave arrangement for connecting rods in tension (pullrods) is shown in FIG. 3. A master pullrod 50 includes a rod portion 52 and a cap portion 54. A crankpin opening 56 is defined in master pullrod 50. Master pullrod 50 couples to a crankpin of a crankshaft (not shown) at crankpin opening 56. In one embodiment, rod portion 52 and cap portion 54 are integrally formed and separated by cooling with liquid nitrogen and cracking, in another embodiment by mechanical separation, or separated by any suitable process. Master pullrod 50 also has a piston bridge opening 58 to couple with a bridge (not shown) on the outer piston (also not shown). Master pullrod 50 also has a master-slave opening into which is placed a pin 72. Pin 72 extends through a master-slave opening (not visible) in a slave pullrod 70. Via the connection at pin 72, slave pullrod 70 is indirectly coupled to the crankpin of the crankshaft (not shown) over which crankpin opening 56 is attached.

In FIG. 4, master pullrod 50 is shown with cap 54 secured by bolts 60, only one of which is visible. Master pullrod 50 includes rod portion 52, which has a piston bridge opening 58, and cap portion 54. Crankpin opening 56 is defined in rod portion 52 and cap portion 54. Cap portion 54 has two fingers 76 extending outwardly. Fingers 76 define master-slave openings 62 into which a pin can be installed.

As discussed earlier, a disadvantage of a master-slave arrangement is that the strokes of the piston connected to the master pullrod is different than that of the piston connected to the slave pullrod. However, due to the longer nature of the pullrod compared to prior pushrod applications, the difference in motion between the pistons connected to the master pullrod and slave pullrods is modest. Centers of crankpin opening 56 and master-slave opening in which pin 72 is installed lie substantially along the centerline of master pullrod 50 in the embodiment shown in FIGS. 3, 4, and 5. In such a case, the difference between the movement of the two pistons is substantially symmetric with the maximum difference occurring nearly at each midstroke.

In FIG. 5, the connection of master pullrods 50 to piston 80 via a piston bridge 82 is shown. On the other end, slave pullrods 70 connect to piston 80 via piston bridge 82. Journals (or crankpins) of the crankshaft (not shown) couple to the master rods 50 and slave rods 70 couple to the crankshaft at crankpin openings 56. Master pullrod 50 couples with slave pullrod 70 via pins 72 that are placed in master-slave openings.

Figure 1:
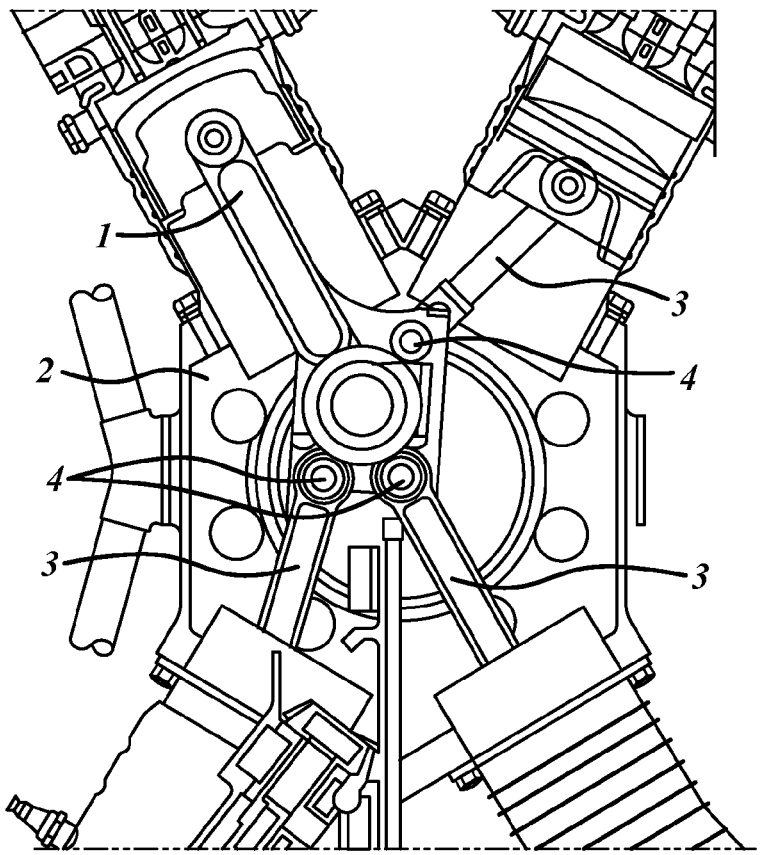
FIG. 1 is a front view of a prior art engine that shows master and slave pushrods.
Figure 6:
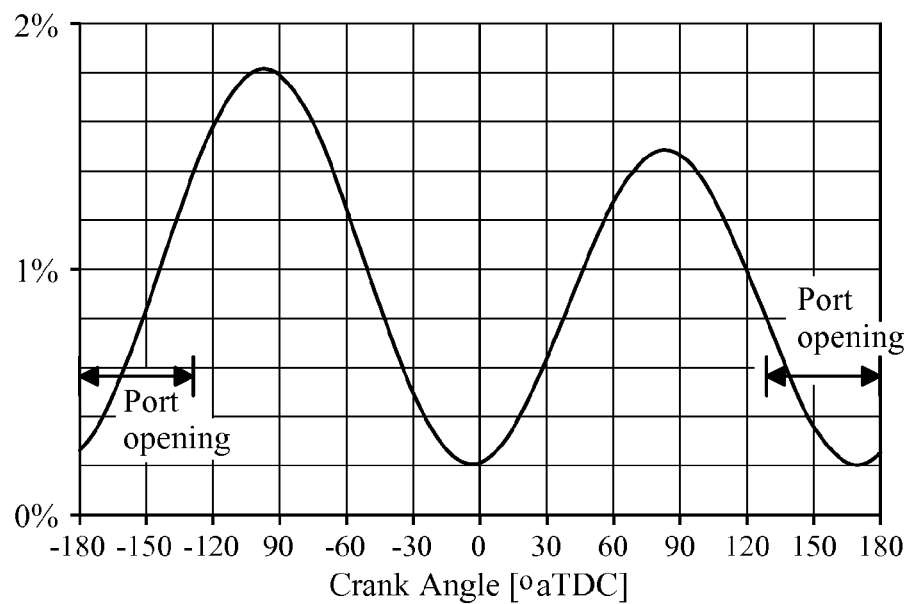
FIG. 6 is a graph of the piston movements for an embodiment of the master and slave pullrods.

As described above, there is a difference in the strokes between the two pistons due to one being connected to the crankshaft with a master pullrod and the other with a slave pullrod. The difference, as plotted in FIG. 6 as a function of crank angle degrees, is shown as a %, i.e., the difference in the strokes divided by the stroke. The data in FIG. 6 are for a development engine of suitable rods, throws, etc. and with the master-slave opening as shown in FIG. 4, i.e., inline. The maximum difference is just under 2% difference with the major difference occurring during midstroke, i.e., away from top center and bottom center positions. The port opening duration occurs predominantly when there is less than a 1% difference in the piston positions between the two pistons. Thus, if the port timings are identical between the two cylinders to accommodate production efficiencies, the difference in the scavenging and other performance parameters is nearly negligible.

The time at which the two pistons are offset can be adjusted, if desired, as shown in FIG. 7, in which a master pullrod 250 has a master-slave opening 274 that is offset from an axis of pullrod 250 through piston bridge opening 258 and crankpin opening 256. Master-slave opening 274 is offset from a centerline 278 of master pullrod 250 by an angle, θ.

The pin in the master slave opening can be fully floating or secured to the master pullrod or slave pullrod. A fully floating embodiment is illustrated in FIG. 8 in a cross-sectional view. Pin 72 may be held in place by two circlips. Circlip 74 is shown installed at the back of pin 72. Circlip 75 is shown uninstalled. Circlip 75 is popped into a groove 78 formed in cap portion 54 of the master rod. When both circlips 74 and 75 are installed, pin 72 is prevented from moving axially. Pin 72 is able to rotate freely within the master-slave opening. Alternatively, pin 72 is fixed to one of the master rod or the slave rod and rotates with respect to the other. In yet another alternative, the pin is not a smooth pin, but is instead needle bearings.

The bolts that are used to secure cap 54 to rod portion 52 of master pullrod 50 may be of a conventional variety. A lightweight fastener, a bolt 260, for this application is shown in FIG. 9. Bolt 260 has coarse threads 262 that engage with threads in the rod section of the master pullrod and fine threads 266 that engage with threads in the cap section of the master pullrod. Between the two threaded regions 262 and 266 is a spacer section 264 that is not threaded. At the end away from the coarse threads 262 is a head 268 that has features on it that engages with a tool (not shown) for tightening.

In FIG. 10, a process to assemble a portion of the crank system is shown. A conventional two-piece shell bearing is placed on the crankpin of the crankshaft in block 300. In block 302, the cap portion of the master pullrod is placed over the shell bearing. It is the crankshaft opening (which is split) that is placed over the shell bearing. In block 304, the rod portion of the master pullrod is placed over the bearing. The cap portion and rod portion of the master pullrod are secured together with bolts or by any other suitable means in block 306. In block 308, the master-slave opening of the slave pullrod is aligned with the master-slave opening of the master pullrod. In block 310, a pin is inserted through the aligned master-slave openings to couple the master and slave rods. In block 312, a circlip (also called a c-clip or snap ring) is squeezed together so that it fits within the master-slave opening. The circlip is allowed to expand into a groove in the master-slave opening. In block 312, the circlip is placed in the master pullrod and into the slave pullrod in block 314. One or the other of blocks 312 and 314 can be performed before any of the processes in FIG. 10. That is, the pin can be slid in with one of the clips already in place.

An embodiment is shown in FIG. 11 illustrating the process to assemble the cap portion to the rod portion of the master pullrod using bolt 260 of FIG. 9. In block 340, head 268 is inserted into the threaded opening of the cap portion. It is inserted into the threaded opening from the inside surface of the cap, not the outer surface. Fine threads 268 (first set of threads) are engaged with threads in the cap portion. Bolt 260 is rotated (left hand rotation) until bolt 260 extends outwardly from the cap of the master rod a predetermined distance in block 350. (The extension is based on a distance from the inside surface of the cap.) In block 360, coarse threads 262 (second set) of bolt 260 are aligned with the threaded opening in the rod portion of master pullrod. In block 370, bolt 262 is rotated (in a right hand direction) a predetermined number of times. Coarse threads 262 pulls the rod portion into the cap as the movement of the rod portion is less than the movement of the cap for each revolution of bolt 260.

While the best mode has been described in detail with respect to particular embodiments, those familiar with the art will recognize various alternative -designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An opposed-piston, opposed-cylinder engine, comprising:
   a first cylinder having a first inner piston and a first outer piston disposed therein;
   a second cylinder having a second inner piston and a second outer piston disposed therein with a central axis of the first cylinder being substantially collinear with a central axis of the second cylinder;
   a crankshaft disposed between the first and second cylinders, the crankshaft having first and second crankpins;
   a first master pullrod coupled between the first outer piston and the first crankpin; and a first slave pullrod coupled between the second outer piston and the first master pullrod with the connection of the first slave pullrod to the first master pullrod located between the second outer piston and the first crankpin, the first slave pullrod indirectly coupled to the crankshaft via connection to the first master pullrod.

2. The engine of claim 1 wherein the master pullrod defines a: piston bridge opening on one end of the master pullrod, and a crankpin opening and a master-slave opening on the other end of the master pullrod; and centers of the piston bridge opening, the crankpin opening, and the master-slave opening are collinear.

3. The engine of claim 1 wherein the first outer piston further comprises a piston bridge coupled to the first piston wherein the first master pullrod couples to the first outer piston via the piston bridge.

4. The engine of claim 1, further comprising:
a second master pullrod coupled to the first outer piston and the coupled directly to the second crankpin; and
a second slave pullrod coupled to the second outer piston and connected to the second master pullrod with the connection of the second slave pullrod to the second master pullrod located between the second outer piston and the second crankpin, the second slave pullrod indirectly coupled to the crankshaft via connection to the second master pullrod.

5. The engine of claim 4 wherein:
the first and second master pullrods define crankpin openings for coupling to the first and second crankpins, respectively; and
the crankpin openings are split substantially along a diameter of the crankpin opening to facilitate assembly onto the crankpins of a one-piece crankshaft.

6. The engine of claim 4 wherein:
the first and second master pullrods have crankpin openings for coupling to the first and second crankpins;
the first and second master pullrods have two fingers on an end proximate the crankpin openings;
the first and second slave pullrods have a finger on a first end of the slave pullrods; and
the fingers on the first master pullrod, the second master pullrod, the first slave pullrod, and the second slave pullrods have master-slave openings of a predetermined diameter; the engine, further comprising:
a first pin inserted through the master-slave openings of the first master pullrod and through the master-slave opening of the first slave pullrod; and
a second pin inserted through the master-slave openings of the second master pullrod and through the master-slave opening of the second slave pullrod.

7. The engine of claim 6 wherein the master-slave openings in the first and second master pullrods are substantially cylindrical with grooves defined in the master-slave openings, the engine further comprising:
first and second retaining rings inserted in the grooves in the master-slave openings in the first master pullrod; and
third and fourth retaining rings inserted in the grooves in the master-slave openings in the second master pullrod.

8. The engine of claim 4 wherein:
the first outer piston further comprises a first piston bridge;
the second outer piston further comprises a second piston bridge;
the first master pullrod couples to the first outer piston via the piston bridge; and the second master pullrod couples to the second outer piston via the second piston bridge.

9. A crankshaft, piston, and connecting rod assembly, comprising:
a crankshaft having first and second crankpins;
a first piston;
a second piston;
a first master pullrod coupled between a first side of the first piston and directly coupled to the first crankpin;
a first slave pullrod coupled between a first side of the second piston and connected to the first master pullrod with the connection of the first slave pullrod to the first master pullrod located between the second piston and the first crankpin, the first slave pullrod indirectly coupled to the crankshaft via connection to the first master pullrod;
a second master pullrod coupled between a second side of the first piston and directly coupled to the second crankpin; and
a second slave pullrod coupled between a second side of the first piston and connected to the second master pullrod with the connection of the second slave pullrod to the second master pullrod located between the second piston and the second crankpin, the second slave pullrod indirectly coupled to the crankshaft via connection to the second master pullrod.

10. The assembly of claim 9 wherein the first and second master pullrods have two fingers that extend outwardly on one end of the pullrod with master-slave openings defined in the fingers; and the first and second slave pullrods have one finger that extends outwardly on one end of the slave pullrod with master-slave openings defined in the fingers, the assembly further comprising:
a first pin inserted through the master-slave openings associated with the first master pullrod and the first slave pullrod; and
a second pin inserted through the master-slave openings associated with the second master pullrod and the second slave pullrod.

11. The crankshaft and connecting rod assembly of claim 10, further comprising:
a first snap ring installed in a groove defined in the first master-slave opening of the first master pullrod proximate a first end of the first pin; and
a second snap ring installed in a groove defined in the first master-slave opening of the first slave pullrod proximate a second end of the first pin.

12. The assembly of claim 9 wherein:
the first and second master pullrods define crankpin openings for coupling to the first and second crankpins, respectively;
the crankpin openings are split substantially along a diameter of the crankpin opening to facilitate assembly onto the crankpins of a one-piece crankshaft; and
both of the first and second master pullrods and both of the first and second slave pullrods define master-slave openings of a predetermined diameter, the engine, further comprising:
a first pin inserted through the master-slave opening of the first master pullrod and through the master-slave opening of the first slave pullrod; and
a second pin inserted through the master-slave opening of the second master pullrod and through the master-slave opening of the second slave pullrod.

* * * * *